United States Patent [19]

Werbelow et al.

[11] Patent Number: 5,796,177
[45] Date of Patent: Aug. 18, 1998

[54] FIRING CIRCUIT FOR MULTIPLE VEHICLE PASSENGER RESTRAINT INITIATORS

[75] Inventors: Joel Martin Werbelow, Noblesville; John Byron Singer, Sheridan; Kevin Dale Kincaid, Kokomo, all of Ind.

[73] Assignee: Delco Electronics Corporation, Kokomo, Ind.

[21] Appl. No.: 858,618

[22] Filed: May 19, 1997

[51] Int. Cl.$^6$ ............................................ B60R 21/00
[52] U.S. Cl. ................. 307/10.1; 701/29; 701/45; 280/728.1; 180/271
[58] Field of Search ........................... 307/9.1, 10.1, 307/10.6, 11, 12, 38, 40, 41; 280/727, 728.1, 734, 735, 801.1, 802, 748; 180/268, 270, 271, 274, 282, 286; 701/1, 29, 31, 33, 34, 36, 45, 46, 47

[56] References Cited

U.S. PATENT DOCUMENTS

| | | | |
|---|---|---|---|
| 4,199,029 | 4/1980 | Marek | 340/652 |
| 4,980,573 | 12/1990 | White et al. | 307/10.1 |
| 4,985,638 | 1/1991 | Brock | 307/38 |
| 5,085,464 | 2/1992 | Behr et al. | 280/735 |
| 5,204,547 | 4/1993 | Schumacher et al. | 280/735 |
| 5,409,258 | 4/1995 | Kawabata | 701/29 |
| 5,411,289 | 5/1995 | Smith et al. | 180/271 |
| 5,459,449 | 10/1995 | Ravas, Jr. et al. | 280/735 |
| 5,596,497 | 1/1997 | Honda | 307/10.1 |
| 5,602,736 | 2/1997 | Toya et al. | 307/10.1 |
| 5,656,991 | 8/1997 | Hargenrader et al. | 280/728.1 |
| 5,701,038 | 12/1997 | Kincaid | 307/10.1 |
| 5,718,451 | 2/1998 | White | 180/268 |
| 5,726,887 | 3/1998 | Spies et al. | 307/10.1 |

OTHER PUBLICATIONS

Disclosed anonymously in Research Disclosure, Jan. 1997 No. 394, RD39419, p. 98, entitled "Two Wire—Two Initiator Control Scheme.".

*Primary Examiner*—Richard T. Elms
*Assistant Examiner*—Peter Ganjian
*Attorney, Agent, or Firm*—Jimmy L. Funke

[57] ABSTRACT

A firing circuit for multiple vehicle passenger restraint initiators, wherein initiators located in proximity to each other are paired in first and second parallel connected firing loops terminated by first and second firing circuit nodes. The first firing loop includes one of the initiators and a first diode poled to conduct current from the first node to the second node, and the second firing loop includes the other initiator and a second diode poled to conduct current in the opposite direction, that is, from the second node to the first node. A switching circuit, such as a four-element bridge couples each pair of firing loops to a source of DC so that the source voltage can be applied to the firing loop nodes in either polarity, depending on whether the switching circuit receives a first firing signal or a second firing signal. The switching circuit and the circuit that develops the firing signals are located together in a control unit so that only two wires must be routed from the control unit to each pair of initiators.

4 Claims, 1 Drawing Sheet

FIRING CIRCUIT FOR MULTIPLE VEHICLE PASSENGER RESTRAINT INITIATORS

This invention relates to circuitry for deploying multiple vehicular passenger restraint devices such as a staged air bag, multiple air bags or seat belt tensioning devices. More particularly, this invention relates to a firing circuit that reduces wiring complexity and cost.

BACKGROUND OF THE INVENTION

The current trend in automotive safety is to equip a vehicle with multiple restraint devices, including frontal air bags, side air bags, rear air bags and seat belt pre-tensioners. Each such device is typically pyrotechnically deployed by an electrically activated initiator or squib. Additionally, certain restraint devices, frontal air bags in particular, can be designed to deploy in multiple stages, each stage being deployed by a separate initiator.

As the number of restraint devices in a vehicle increases, the overall number of wires which must be routed through the vehicle instrument panel, steering column, door jambs, etc., likewise increases. Typical automotive restraint systems require two wires routed to each initiator in order to enable comprehensive detection and discrimination of possible failure modes, as well as to fire the initiator. Clearly, a deployment circuit that reduces the number of wire connections without compromising failure mode detection and discrimination is desired.

SUMMARY OF THE PRESENT INVENTION

The present invention is directed to an improved firing circuit for multiple vehicle passenger restraint initiators, wherein the number of wires that must be routed to the various initiators is reduced by one-half compared to conventional systems without compromising initiator failure mode detection and discrimination.

According to this invention, initiators located in proximity to each other are paired in first and second parallel connected firing loops terminated by first and second firing circuit nodes. The first firing loop includes one of the initiators and a first diode poled to conduct current from the first node to the second node, and the second firing loop includes the other initiator and a second diode poled to conduct current in the opposite direction, that is, from the second node to the first node. A switching circuit, such as a four-element bridge couples each pair of firing loops to a source of DC so that the source voltage can be applied to the firing loop nodes in either polarity, depending on whether the switching circuit receives a first firing signal or a second firing signal. The switching circuit and the circuit that develops the firing signals are located together in a control unit so that only two wires must be routed from the control unit to each pair of initiators. As with conventional firing circuits, the switching circuit can be enabled in a current limited mode to enable diagnostic testing for open and short circuit detection, out of range initiator resistance, etc.

The pairing of initiators according to this invention is particularly convenient as applied to a staged air bag, where a first initiator deploys a first inflation stage for low-to-medium energy collisions, and a second initiator subsequently deploys a second inflation stage if the collision is determined to be severe. This is especially true in the case of a driver air bag where the firing circuit wires must be routed through the clock spring area of the vehicle steering column. However, a significant wiring reduction benefit can also be achieved by pairing initiators for separate restraint devices, such as driver and passenger air bags.

DETAILED DESCRIPTION OF THE DRAWINGS

Figure 1:
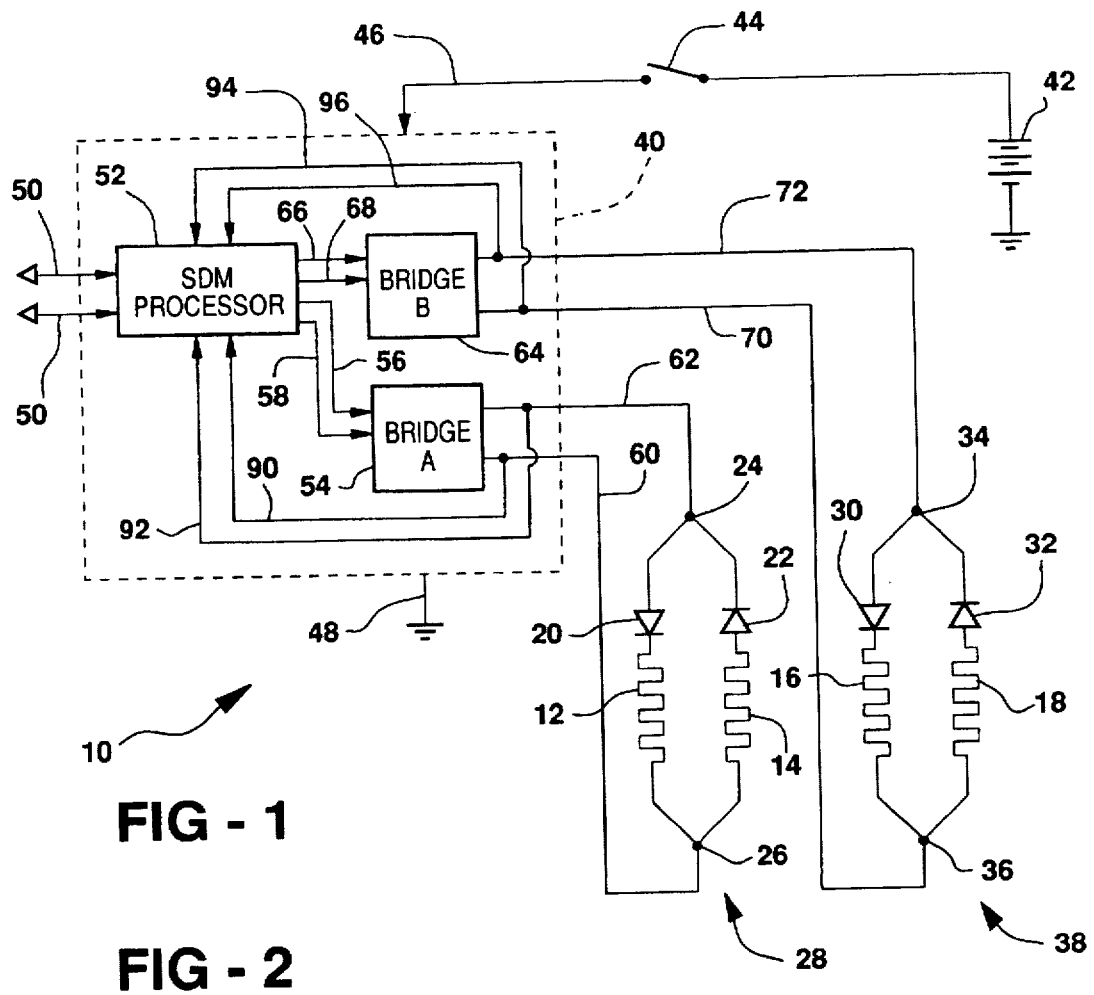
FIG. 1 is a circuit diagram of a vehicular restraint system according to this invention, including a control unit and two paired initiators.

Referring to FIG. 1, the reference numeral 10 generally designates a vehicle restraint system having two pairs of initiators 12, 14; and 16, 18. These initiators may be physically packaged in variety of different ways. For example, the initiators 12 and 14 may be packaged to control the first and second stages of a two-stage driver-side air bag, and the initiators 16 and 18 may be packaged to control the first and second stages of a two-stage passenger-side air bag. Alternatively, the initiators may be packaged to deploy side air bags, rear air bags, seat belt pre-tensioners, or any other pyrotechnically deployed vehicle passenger restraint devices. With the firing circuit of this invention, however, the most advantageous packaging occurs with paired initiators located in proximity to each other, such as in a two-stage device. In the illustrated embodiment, it will be assumed that the paired initiators 12 and 14 control the first and second stages of a two-stage driver-side air bag, and the paired initiators 16 and 18 control the first and second stages of a two-stage passenger-side air bag.

The paired initiators 12 and 14 are serially connected with diodes 20 and 22, respectively, and mutually terminated at nodes 24 and 26 to form a first parallel connected firing circuit 28. The diode 20 is poled to conduct current from node 24 to node 26, while diode 22 is poled to conduct current from node 26 to node 24. Similarly, the paired initiators 16 and 18 are serially connected with diodes 30 and 32, respectively, and mutually terminated at nodes 34 and 36 to form a second parallel connected firing circuit 38. The diode 30 is poled to conduct current from node 34 to node 36, while diode 32 is poled to conduct current from node 36 to node 34.

The restraint system 10 further comprises a sensing and diagnostic module (SDM) 40 coupled to the firing circuits 28 and 38 for controlling deployment of one or more of the passenger restraint devices of the vehicle. The SDM 40 is connected to the vehicle storage battery 42 through a conventional ignition switch 44, as schematically indicated by module supply line 46 and module ground line 48. One or more acceleration sensors 50 supply raw or filtered acceleration data to the SDM Processor 52, which may implemented with a conventional micro-controller or equivalent. The SDM Processor 52 processes the acceleration data provided by sensors 50, determines whether and when to fire one or more of the initiators 12–18, and performs various diagnostic tests to determine whether the initiators and firing circuit wiring are in good working order. A first transistor bridge circuit (BRIDGE A) 54, connected to SDM Processor 52 via signal lines 56 and 58, controls the firing of initiators 12 and 14 via output lines 60 and 62, while a second transistor bridge circuit (BRIDGE B) 64, connected to SDM Processor 52 via signal lines 66 and 68, controls the firing of initiators 16 and 18 via output lines 70 and 72. For each bridge circuit 54, 64, one of the SDM signal lines initiates the firing of a first initiator within the respective firing circuit, while the other signal line initiates the firing of a second initiator within the respective firing circuit.

Figure 2:
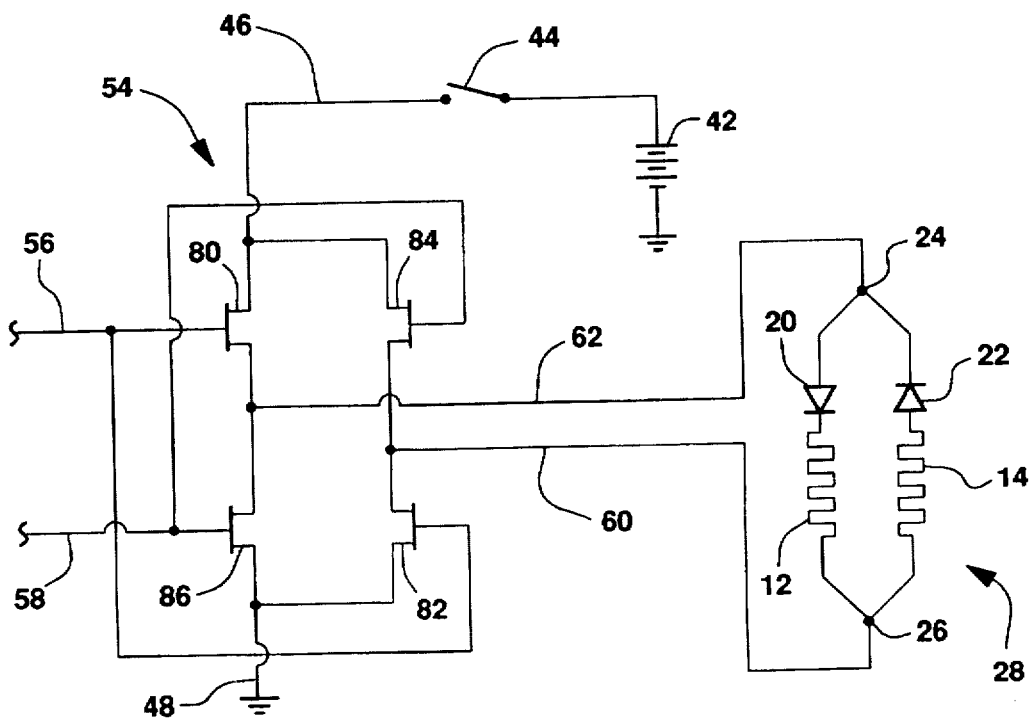
FIG. 2 is a more detailed circuit diagram of the control unit and one of the pairs of initiators depicted in FIG. 1.

FIG. 2 depicts a circuit diagram of bridge circuit 54 and firing circuit 28, where various elements described above in reference to FIG. 1 have been assigned the same reference numerals. For simplicity, various details, such as filter elements and high-side pre-driver circuits, have been omitted. The bridge circuit 54 comprises four power transistors (field-effect transistors in the illustrated embodiment) 80–86 connected across battery 42 in a standard H-switch bridge configuration. Output line 60 is connected to the junction of bridge transistors 82 and 84, while output line 62 is connected to the junction of bridge transistors 80 and 86. The conduction of bridge transistors 80 and 82 is controlled by signal line 56, while the conduction of bridge transistors 84 and 86 is controlled by signal line 58.

When SDM Processor 52 impresses a suitable control voltage on signal line 56, the transistors 80 and 82 are biased conductive to connect positive battery voltage to firing circuit node 24 and negative battery voltage to firing circuit node 26. This reverse-biases diode 22 and forward-biases diode 20 to conduct current through initiator 12. Similarly, when SDM Processor 52 impresses a suitable control voltage on signal line 58, the transistors 84 and 86 are biased conductive to connect positive battery voltage to firing circuit node 26 and negative battery voltage to firing circuit node 24. This reverse-biases diode 20 and forward-biases diode 22 to conduct current through initiator 14. Current limiting elements (not shown) may be used to limit the current supplied to the initiators. Obviously, the foregoing description of bridge circuit 54 and firing circuit 28 applies equally to other bridge and firing circuits comprised within the system 10.

In view of the above, it will be understood that SDM Processor 52 can only direct current to one of two parallel connected initiators at any given time. This is compatible with most vehicle safety restraint systems since the deployment timing is typically staggered or staged based on the acceleration processing to provide the maximum safety benefit to the vehicle passengers. Sequential firing of paired initiators is particularly compatible with a two-stage air bag device, as such devices are typically designed to provide sequential deployment stages. However, if concurrent firing of paired initiators is desired, the desired operation may be achieved by programming the SDM Processor 52 to modulate the signal lines 56 and 58 on and off at a 50% duty cycle. Modulation of the lines 56 and 58 at a different duty cycle is also possible to achieve very closely staggered firing of paired initiators, if desired.

In addition to controlling deployment of the various restraint devices, the SDM Processor 52 periodically performs a battery of conventional diagnostic tests to identify and isolate any wiring, connector or part anomalies that would adversely affect the system performance. Typically, the tests are designed to detect open and short circuits, due to pinched wires or faulty connectors, for example, or the electrical resistance of a given initiator. This is achieved by supplying a small test current to the firing circuits, and observing the voltage drop at predetermined test points. To this end, SDM 40 is configured to receive voltage feedback pertaining to the first firing circuit 28 via feedback lines 90 and 92, and to the second firing circuit 38 via feedback lines 94 and 96. As an example, the SDM Processor 52 might activate signal line 56 in a current limited mode to supply a small test current through initiator 12, and compare the voltage on feedback line 90 with one or more predetermined reference voltages.

A significant advantage of the paired initiator arrangement of this invention is that a substantial voltage deviation occurs in the presence of certain wiring anomalies due to the serially connected diodes 20, 22, 30, 32. That is, the detection circuitry of SDM Processor 52 will observe a deviation of at least one diode-drop in the event of certain short-circuit conditions. For example, if the firing circuit nodes 24 and 26 are accidentally shorted together, due to pinched wiring or an engaged shorting clip, the diagnostic circuitry will observe an initiator voltage drop of 0 volts, as opposed to the normal diode and initiator voltage drops of about 0.7 volts. Without the firing circuit diode, on the other hand, the diagnostic circuitry would have to distinguish between the voltage drops associated with the normal initiator resistance of approximately 2 ohms, and the short circuit resistance of 0 ohms. Such a resistance difference can be difficult to detect, particularly with small test currents. As a result, such short-circuit conditions may be detected more easily and reliably with the paired initiator arrangement of the present invention than with conventional firing circuits.

When a possible fault is detected and isolated, the SDM Processor can activate a warning indicator, and either disable activation of the restraint systems or employ an alternate activation scheme. In this regard, a particular aspect of the paired initiator arrangement of this invention is that one of the paired initiators can still be fired even if the other initiator of the same pair is damaged or open-circuited. Additionally, the operation of the bridge circuits 54 and 64 provide added flexibility for firing at least some of the initiators even in the presence of a short circuit. For example, if the SDM Processor 52 detects that the node 24 of firing circuit 28 is shorted to ground potential, the initiator 14 may still be fired by activating the signal line 58 to connect positive battery voltage to the node 26.

In summary, the paired initiator firing circuit of this invention reduces by one-half the number of wires that must be routed to the various initiators of a multiple initiator passenger restraint system compared to conventional systems without compromising firing circuit failure mode detection and discrimination. In fact, the ease and reliability of failure mode discrimination and the failure mode performance in certain situations are both improved according to this invention.

While this invention has been described in reference to the illustrated embodiment, it is expected that various modifications in addition to those suggested above will occur to those skilled in the art. In this regard, it will be understood that the scope of this invention is not limited to the illustrated embodiment, and that systems incorporating such modifications may fall within the scope of this invention, which is defined by the appended claims.

The embodiments of the invention in which an exclusive property or privilege is claimed are defined as follows:

1. A firing circuit for multiple vehicle passenger restraint initiators, comprising:

first and second electrically activated initiators for deploying first and second passenger restraint devices;

first and second firing loops connected in parallel between first and second firing circuit nodes, the first firing loop comprising said first electrically activated initiator and a first diode poled to conduct current from said first node to said second node, and the second firing loop comprising said second electrically activated initiator and a second diode poled to conduct current from said second node to said first node;

a source of direct voltage having first and second terminals of opposing polarity; and a switching circuit connected between said source of direct voltage and said first and second firing loops, said switching circuit including a first pair of switches operative in response to a first deployment signal to connect said first and second terminals of said source to said first and second firing circuit nodes, respectively, to activate said first initiator for deploying the first restraint device, and a second pair of switches operative in response to a second deployment signal to connect said first and second terminals of said source to said second and first firing circuit nodes, respectively, to activate said second initiator for deploying the second restraint device.

2. A firing circuit for a staged, pyrotechnically deployed vehicle passenger restraint device, comprising:

first and second electrically activated initiators for deploying first and second stages of said restraint device;

first and second firing loops connected in parallel between first and second firing circuit nodes, the first firing loop comprising said first electrically activated initiator and a first diode poled to conduct current from said first node to said second node, and the second firing loop comprising said second electrically activated initiator and a second diode poled to conduct current from said second node to said first node;

a source of direct voltage having first and second terminals of opposing polarity; and a switching circuit connected between said source of direct voltage and said first and second firing loops, said switching circuit including a first pair of switches operative in response to a first deployment signal to connect said first and second terminals of said source to said first and second firing circuit nodes, respectively, to activate said first initiator for deploying the first stage of said restraint device, and a second pair of switches operative in response to a second deployment signal to connect said first and second terminals of said source to said second and first firing circuit nodes, respectively, to activate said second initiator for deploying the second stage of said restraint device.

3. A firing circuit for multiple vehicle passenger restraint initiators, comprising:

first and second electrically activated initiators for deploying first and second passenger restraint devices;

first and second firing loops connected in parallel between first and second firing circuit nodes, the first firing loop comprising said first electrically activated initiator and a first diode poled to conduct current from said first node to said second node, and the second firing loop comprising said second electrically activated initiator and a second diode poled to conduct current from said second node to said first node;

a source of direct voltage having first and second terminals of opposing polarity;

a controller for determining whether and when said first and second passenger restraint devices should be deployed; and a switching circuit controlled by said controller, and connected between said source of direct voltage and said first and second firing loops, said controller biasing said switching circuit to a first mode to connect said first and second terminals of said source to said first and second firing circuit nodes, respectively, when said first restraint device should be deployed, and to a second mode to connect said first and second terminals of said source to said second and first firing circuit nodes, respectively, when said second restraint device should be deployed.

4. The firing circuit of claim 3, wherein said controller modulates said switching circuit between said first and second modes to effect concurrent or closely staggered deployment of said first and second restraint devices.

* * * * *